United States Patent
Shirasaki et al.

(10) Patent No.: US 6,317,526 B1
(45) Date of Patent: Nov. 13, 2001

(54) OPTICAL PHASE CONTROLLER AND OPTICAL SWITCH

(75) Inventors: Masataka Shirasaki, Winchester, MA (US); Simon Cao, San Mateo, CA (US)

(73) Assignees: Fujitsu Limited, Kawasaki (JP); Avanex Corporation, Fremont, CA (US)

( * ) Notice: Subject to any disclaimer, the term of this patent is extended or adjusted under 35 U.S.C. 154(b) by 0 days.

(21) Appl. No.: 09/216,984

(22) Filed: Dec. 21, 1998

(51) Int. Cl.$^7$ .................................................. G02F 1/035
(52) U.S. Cl. .................................... 385/3; 385/2; 356/477
(58) Field of Search .................................. 385/1, 2, 3, 16, 385/18, 17; 356/345, 477

(56) References Cited

U.S. PATENT DOCUMENTS

| | | | |
|---|---|---|---|
| 5,073,331 | * 12/1991 | Shirasaki | 372/26 |
| 5,247,594 | * 9/1993 | Okuno et al. | 385/17 |
| 5,653,008 | * 8/1997 | Sim et al. | 385/16 |
| 5,657,148 | * 8/1997 | Feuer et al. | 359/263 |
| 5,881,199 | * 3/1999 | Li | 385/140 |
| 5,892,863 | * 4/1999 | Presby | 385/16 |
| 6,035,080 | * 3/2000 | Henry et al. | 385/24 |
| 6,163,633 | * 12/2000 | Ueda | 385/16 |

OTHER PUBLICATIONS

Q. Lai, et al., Low–Power compact 2×2 Thermooptic Silica–on–Silicon Waveguide Switch with Fast Response, IEEE Photonics Technology Letters, vol. 10, No. 5, pp. 681–683, May 1998.

Masataka Shirasaki, et al., Magnetooptical 2×2 Switch for Single–Mode Fibers, Applied Optics, vol. 23, No. 19, pp. 3271–3276, Oct. 1, 1984.

Masataka Shirasaki, et al., Nonmechanical Optical Switch for Single–Mode Fibers, Applied Optics, vol. 21, No. 23, pp. 4229–4234, Dec. 1, 1982.

Masataka Shirasaki, et al., A Compact Polarization–Independent Optical Circulartor, The Transactions of the IECE of Japan, vol. E64, No. 1, pp. 30–31, Jan. 1981.

M. Shirasaki, et al., Compact Polarization–Independent Optical Circulator, Applied Optics, vol. 20, No. 15, pp. 2683–2687, Aug. 1, 1981.

M. Shirasaki, et al., Bistable Optical Switch Using a Yttrium–Iron Garnet Crystal with Phase Matching Films, App. Phys. Lett. 38(11), pp. 833–834, Jun. 1, 1981.

M. Shirasaki, et al., Bistable Magnetooptic Switch for Multimode Optical Fiber, Applied Optics, vol. 21, No. 11, pp. 1943–1949, Jun. 1, 1982.

* cited by examiner

*Primary Examiner*—Frank G. Font
*Assistant Examiner*—Layla Lauchman
(74) *Attorney, Agent, or Firm*—Staas & Halsey LLP

(57) ABSTRACT

A heater coats an optical fiber. In addition, an apparatus, such as an optical switch, a Mach-Zehnder interferometer, or a Michelson interferometer, includes optical fibers transmitting light in optical paths, and 3-dB couplers, coupled to the optical fibers, splitting input light into the optical paths, and recombining output light into output paths. The apparatus also includes the heater coating a portion of one of the optical fibers and heating the one of the optical fibers to change the optical phase of the light traveling in the one of the optical paths. A second heater coats a portion of another of the optical fibers and heats the another of the optical fibers to change the relative optical phase of the light traveling in the one of the optical paths and the another of the optical paths. A detector is coupled to one of the optical paths and detects power of leaked light in the optical path and a heater controller is coupled to the detector and to the heater, and controls the heater based upon the power of the leaked light.

47 Claims, 8 Drawing Sheets

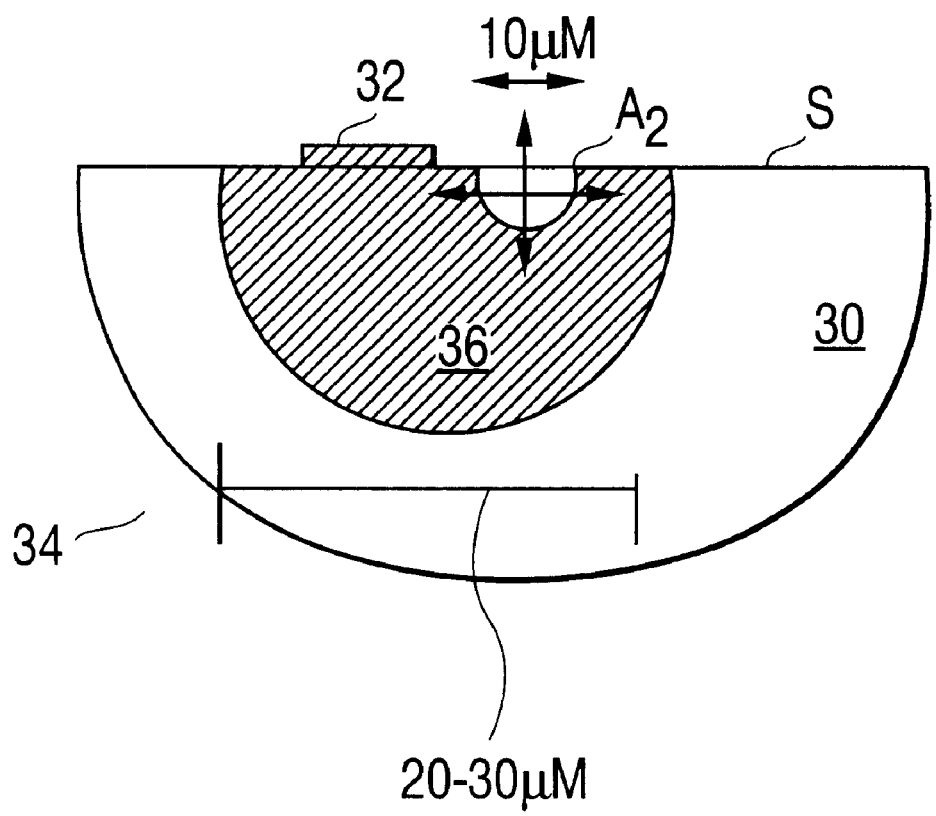

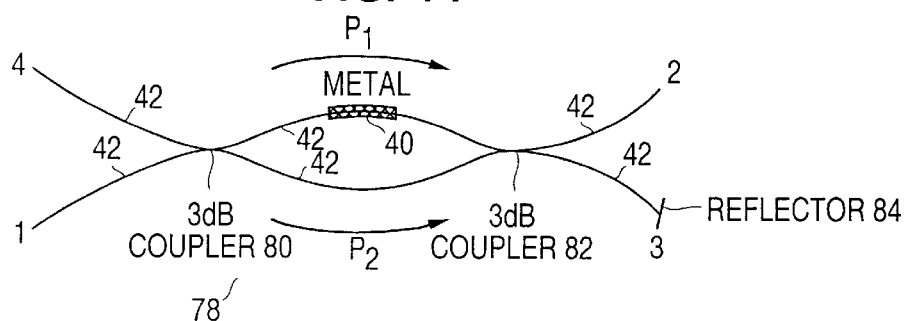
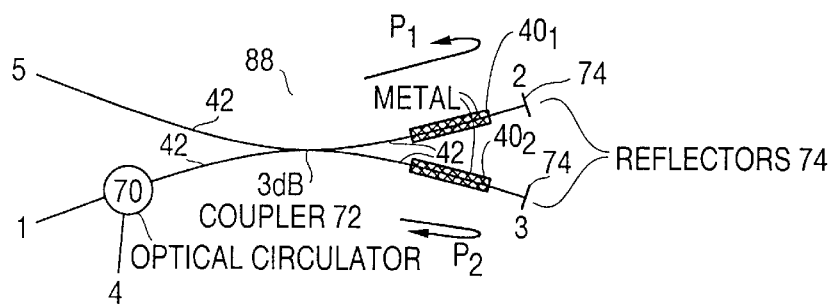
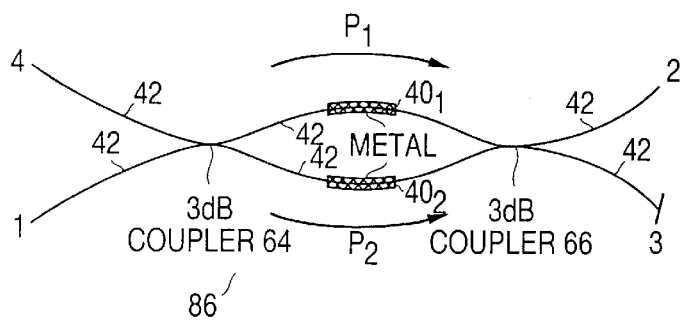
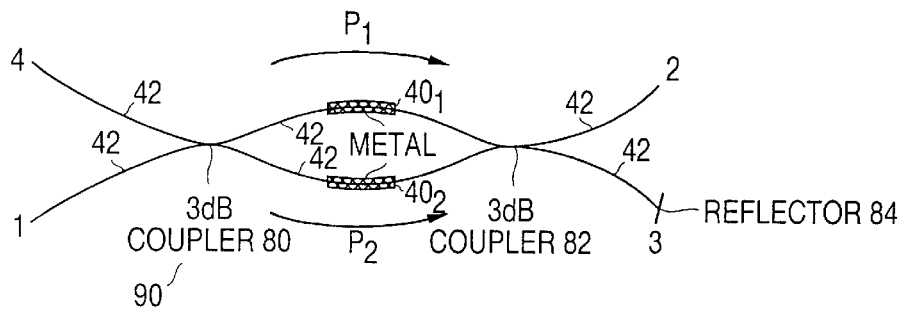

OPTICAL PHASE CONTROLLER AND OPTICAL SWITCH

BACKGROUND OF THE INVENTION

1. Field of the Invention

The present invention is related to optical switches, and, more particularly to switching input light between output paths in an optical switch using a heater.

2. Description of the Related Art

An optical switch is a device which switches input light between output optical paths. For example, when the input light enters the optical switch from an input fiber, the light exits the optical switch through one of two output fibers. This is a 1-input 2-output switch or 1 by 2 switch, which is the most fundamental switch. There are more complicated switches, such as 2 by 2, 1 by N, N by N switches, which are realized by combining several 1 by 2 switches.

The most common method of switching the light path (the path which the input light follows through the optical switch) is a mechanical one. The switch has a moving part, such as a prism, a mirror, or a piece of fiber, that is mechanically moved to switch the light path. The mechanical switches have a drawback of slow switching and being less reliable in switching operations. For this reason, researchers have attempted to develop a non-mechanical switch. One practical non-mechanical switch is a magneto-optical switch, which is an optical switch using Faraday rotation and which was commercialized by FDK. Another type of non-mechanical switch uses a liquid crystal, which has a problem in the reliability of the liquid crystal itself.

FIG. 1 shows an example of a bulk switching device 10 of the prior art based upon a Mach-Zehnder interferometer. Mach-Zehnder interferometers are well-known in the art. The bulk switching device 10 receives input light A. Input light A is then split between paths $A_1$ and $A_2$ using conventional 50/50 coupler (or splitter) 12, which directs half of the power of input light A to travel along path $A_1$ and the other half to travel along path $A_2$. The 50/50 coupler is also referred to as a 3-dB coupler.

The portion of the input light A following path $A_1$ is reflected off of mirror 14 to 50/50 coupler (or splitter) 22. The portion of the input light A following path $A_2$ travels through glass block 16 (on top of which heater 18 is situated) and is reflected off of mirror 20 to 50/50 coupler (or splitter) 22. Then, 50/50 coupler 22 recombines the light arriving from path $A_1$ and the light arriving from path $A_2$ into output light B and C. The power included in output light B and in output light C is dependent upon the relative phase between the light arriving from path $A_1$ and the light arriving from path $A_2$, that is, whether the light from path $A_1$ is in-phase (the phases of the light traveling in $A_1$ and $A_2$ differ by 0 radians or an integer multiple of $2\pi$ radians), out-of-phase (the phases of the light traveling in $A_1$ and $A_2$ differ by $\pi/2$ radians or an odd-number multiple of $\pi/2$ radians), opposite phase (the phases of the light traveling in $A_1$ and $A_2$ differ by $\pi$ radians or an odd-number multiple of $\pi$ radians), etc., with the light from path $A_2$. Accordingly, the input light A is switched between output path B and output path C.

The bulk switching device 10 is an optical switch which switches output paths based upon temperature change. More particularly, the relative phase between the light arriving at 50/50 coupler 22 from paths $A_1$ and $A_2$ can be changed by glass block 16 by using heater 18 to heat the glass block 16 and change the refractive index of the glass block 16, thus switching the output light path between output path B and C.

However, the temperature changes are very slow because the glass block 16 is relatively large, on the order of 5 mm×5 mm or 1 cm. Therefore, minutes are required to switch the output light between paths B and C, which is too slow to be practical in lightwave systems. FIG. 2 shows a cross-section of glass block 16 with heater 18 in the prior art. Glass block 16 includes a light beam 24 through which light traveling along path $A_2$ passes.

Because of its slow speed, the bulk switching device 10 is not of practical use as an optical switch.

Currently, there is work taking place on non-mechanical switches using optical waveguides. But the optical waveguide switches are not yet in use because of their large insertion loss and crosstalk.

An example of a waveguide switch of the related art is shown in FIG. 3A, which shows a Mach-Zehnder interferometer switch 26. As shown in FIG. 3A, when input light A traveling in fiber 27 enters an input waveguide 28 formed on the surface of a glass (or another crystal) substrate 30, the input light A is split into two arms $A_1$ and $A_2$ of the waveguide 28. The light traveling in arms (or paths) $A_1$ and $A_2$ is then combined into one of the two output waveguides B or C, each of which is coupled to a respective fiber. Here, the output light can travel into one of the two waveguides B or C, depending on the optical phase difference between the light traveling through the two arms $A_1$ and $A_2$. If one of two arms, for example $A_2$, is heated with a heater 32, the temperature change of the waveguide $A_2$ changes the refractive index of path $A_2$ which causes a change in optical phase of the light traveling through $A_2$. Thus, the output light path is switched between B and C by an electric current input into the heater 32. The heater 32 is, for example, a metal coating on the glass surface 30, and is attached to the waveguide $A_2$.

A cross section 34 of the substrate 30 which includes heater 32 is shown in FIG. 3B. As shown in FIG. 3B, the heater 32 is placed on the surface S of the substrate 30 and to the side of waveguide $A_2$, and heats an area 36 which includes waveguide $A_2$. The area 36 is typically 20–30 micrometers in diameter, while the diameter of the waveguide $A_2$ is typically 10 micrometers, which means that the temperature change in the waveguide $A_2$ effected by the heater 32 is very quick, and, accordingly, the switching speed of the switch 26 is very fast. However, since the waveguide $A_2$ is formed on the surface of the substrate 30 and is not enclosed by the substrate 30, the waveguide $A_2$ is asymmetric, which affects the polarization of the light traveling within the waveguide $A_2$. The polarization of the light traveling in the waveguide $A_2$ is affected in that the horizontal component of the light and the vertical component of the light may each be traveling at different speeds, and may, therefore, have different optical phases when they reach the end of the waveguide $A_2$. Accordingly, the horizontal oscillation of the light traveling in waveguide $A_2$ may be different than the vertical oscillation of the light traveling in waveguide $A_2$, and the proper interference between the light traveling in arm $A_1$ may not occur with the light traveling in arm $A_2$, thus producing incorrect output from the interferometer (or switch) 26.

Since the switch 26 is made on a glass or other crystalline substrate, it is very expensive to make. The switch 26 is also difficult to make. In addition, the switch 26 is polarization dependent, as discussed herein above, with the polarization state of the light traveling through a fiber being unable to be maintained along the fiber for a long distance, such as ½–1 meter or longer.

The switch 26 shown in FIG. 3A is explained in "Low-Power Compact 2×2 Thermooptic Silica-on-Silicon Waveguide Switch with Fast Response", by Q. Lai, W. Hunziker, and H. Melchior, IEEE Photonics Technology Letters, Vol. 10, No. 5, pp. 681–683, May 1998.

Further, and generally, optical waveguide devices of the related art also experience problems coupling to input and output fibers.

Also known in the art is a Mach-Zehnder interferometer using optical fibers and 3-dB couplers. The maintenance of the polarization state of the light traveling in an optical fiber is one of the most critical problems in most fiber interferometers using normal (conventional) fibers, not birefringent (polarization maintaining) fibers. Typically, the polarization state of the light traveling through a fiber changes over a distance of ½ meter.

A problem is that normal optical fibers cannot maintain the polarization state of the light traveling through them for longer distances, such as ½–1 meter. Therefore, if the polarization state of the input light to a Mach-Zehnder interferometer using optical fibers is (for example) vertical, then, after traveling through a first 3-dB coupler, through 2 arms including optical fibers for a longer distance, then to a second 3-dB coupler, the light from either or both of the 2 arms may not have maintained vertical polarization. Accordingly, the light from the 2 arms may not properly interfere with each other at the output of the Mach-Zehnder interferometer, the light may not be transmitted to the proper output path, and some light may be transmitted to an improper output path. Birefringement (polarization-maintaining) fibers are known in the art and are commercially-available, but include disadvantages themselves.

The structure of 3-dB couplers of the related art is shown in FIGS. 4A and 4B. The 3-dB coupler 36 shown in FIG. 4A is made by melting two fibers after the fibers are twisted. The 3-dB coupler 38 shown in FIG. 4B is made by contacting two fibers after each of the fibers are shaved on one of their surfaces.

Michelson interferometers are also known in the art.

Optical circulators, which are well-known in the art, are non-reciprocal devices (being implemented typically using a magnetic field), and have several input/output ports, with light entering a given port and being circulated typically in a clockwise manner to the next adjacent output port.

SUMMARY OF THE INVENTION

An object of the present invention is to provide an optical switch which is fast, reliable, and inexpensive to manufacture.

Another object of the present invention is to provide an optical controller which is fast, reliable, and inexpensive to manufacture.

A further object of the present invention is to provide an optical switch which is not polarization dependent, and which has a fast switching speed.

Yet another object of the present invention is to provide an optical switch which successively switches input light between at least two paths without waiting for one of the optical paths heated by a heater to cool.

Although a Mach-Zehnder interferometer using optical fibers and 3-dB couplers is known in the art, the present invention provides a way to control the temperature of an optical fiber, where the optical fiber is an arm of a Mach-Zehnder interferometer. In addition, the present invention is an optical phase controller using the heater of the present invention. Further, the present invention is an optical switch using the heater of the present invention.

One aspect of the present invention is a heater coating an optical fiber. By changing the temperature in one or more arms of the Mach-Zehnder interferometer by the heater of the present invention, the refractive index of the optical fiber changes, and, accordingly, the optical phase of the light passing through the optical fiber is changed, switching output light between output paths. Using this principle, an optical switch including the heater of the present invention can be constructed.

The present invention is a Mach-Zehnder interferometer comprising optical fibers forming arms of the interferometer, and 3-dB couplers splitting input light between the arms and recombining light from the arms into output paths, wherein one of the arms includes a heater heating the one of the arms.

The present invention is a Michelson interferometer comprising optical fibers forming arms of the interferometer, and a 3-dB coupler splitting input light between the arms and recombining light from the arms into output paths, wherein one of the arms includes a heater heating the one of the arms.

In addition, the present invention is an apparatus, such as an optical switch, a Mach-Zehnder interferometer, or a Michelson interferometer, and includes optical fibers transmitting light in optical paths, 3-dB couplers, coupled to the optical fibers, splitting input light into the optical paths, and recombining output light into output paths, and a heater coating a portion of one of the optical fibers which form the optical paths and heating the optical fiber to change the optical phase of the light traveling in the optical path. A second heater coats a portion of another optical fiber and heats the optical fiber to change the relative optical phase of the light traveling in the optical paths. A detector is coupled to one of the optical paths and detects power of leaked light in the optical path and a heater controller is coupled to the detector and to the heater, and controls the heater based upon the power of the leaked light.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3B shows a cross section of the substrate of the Mach-Zehnder interferometer shown in FIG. 3A.

FIG. 11 shows an optical switch of the present invention having improved crosstalk.

FIG. 12 shows a Mach-Zehnder interferometer of the present invention including two heaters of the present invention.

FIG. 13 shows a Michelson interferometer of the present invention including two heaters of the present invention.

FIG. 14 shows an optical switch of the present invention having improved crosstalk and two heaters of the present invention.

DESCRIPTION OF THE PREFERRED EMBODIMENTS

Figure 5:
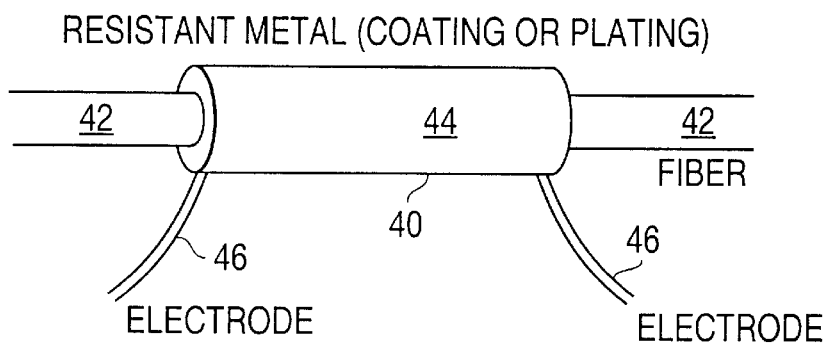
FIG. 5 shows the heater of the present invention.

The heater 40 of the present invention is shown in FIG. 5. As shown in FIG. 5, a normal optical fiber 42 is either coated or plated with a resistant metal 44. The fiber 42 is completely surrounded by the metal 44. The metal 44 is preferably made of gold but can be any material. Gold is preferable because gold is chemically stable. The thickness and the length of the metal 44 are designed so that the heater 40 of the present invention generates the necessary heat when a desired voltage and current are applied to the metal 44. For example, the thickness of the metal 44 is preferable 0.1–50 $\mu$m (micrometers) and the length is preferably 1–20 mm (millimeters). The heater 40 of the present invention includes electrodes 46 placed on both sides of the metal 44, which causes electric current to flow in the metal along the optical fiber.

For a Mach-Zehnder interferometer to switch the light path from one output to the other, the optical phase between the two arms of the Mach-Zehnder interferometer must be changed by $\pi$. This optical phase change is obtained by a temperature change of ~10 degree Celsius when the heater 40 of the present invention is 1 cm long.

As shown in FIG. 5, the heater 40 of the present invention surrounds, or coats, the optical fiber 42, whereas, in the prior art, the heater 18 is located on the glass block 16, or the heater 32 is located on the surface of the substrate 30 (refer to FIG. 3) having a waveguide. Therefore, the heater 40 of the present invention offers several advantages over the heater 18 or 32 of the prior art, including requiring a small area of material for the heater 40 and having no polarization dependence. The small area of material required for the heater 40 of the present invention results in a quick temperature change in the heater 40, and, accordingly, in the fiber 42. This quick temperature change in the fiber 42 results in quick switching if the fiber 42 (and heater 40) is included in an optical switch. There is no polarization dependence for the light traveling through the fiber 42 coated by the heater 40 of the present invention because the fiber 42 (acting as a waveguide) is short (typically between 1 mm and 50 mm, but most likely 2–3 cm.) and is symmetric in shape, and, accordingly, the light traveling through the fiber 42 is presented with the same environment in both the horizontal and vertical directions.

Figure 1:
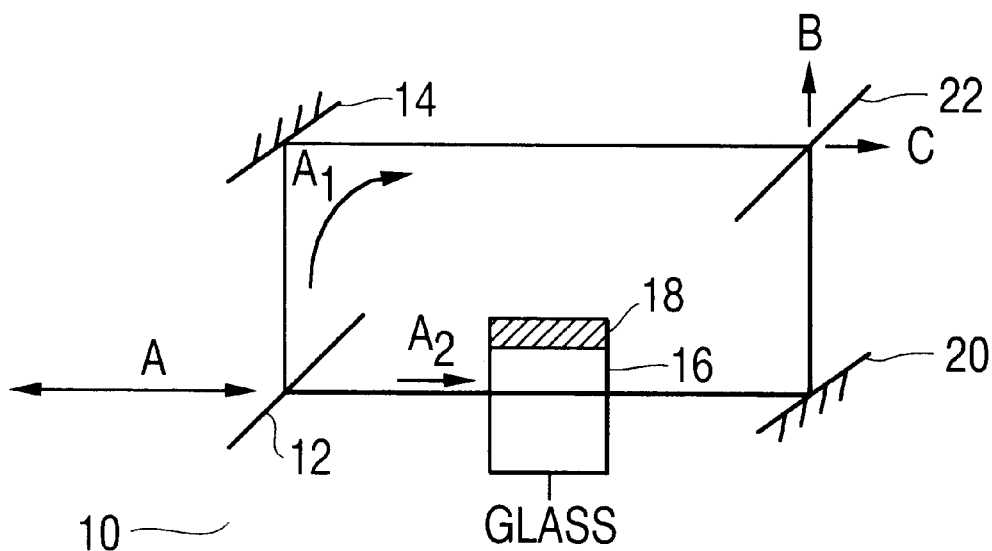
FIG. 1 shows an example of a bulk switching device 10 of the prior art based upon a Mach-Zehnder interferometer.
Figure 2:
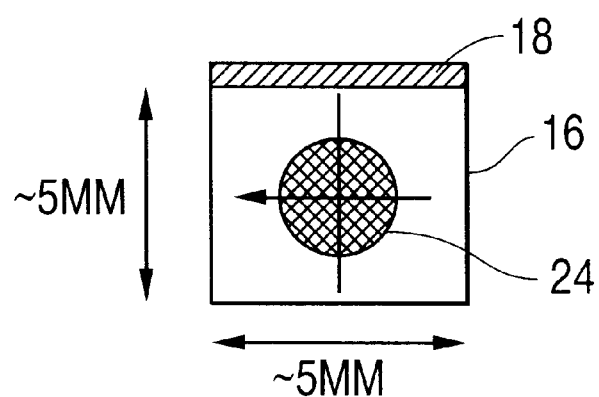
FIG. 2 shows a cross-section of glass block with heater 18 in the prior art.
Figure 3A:
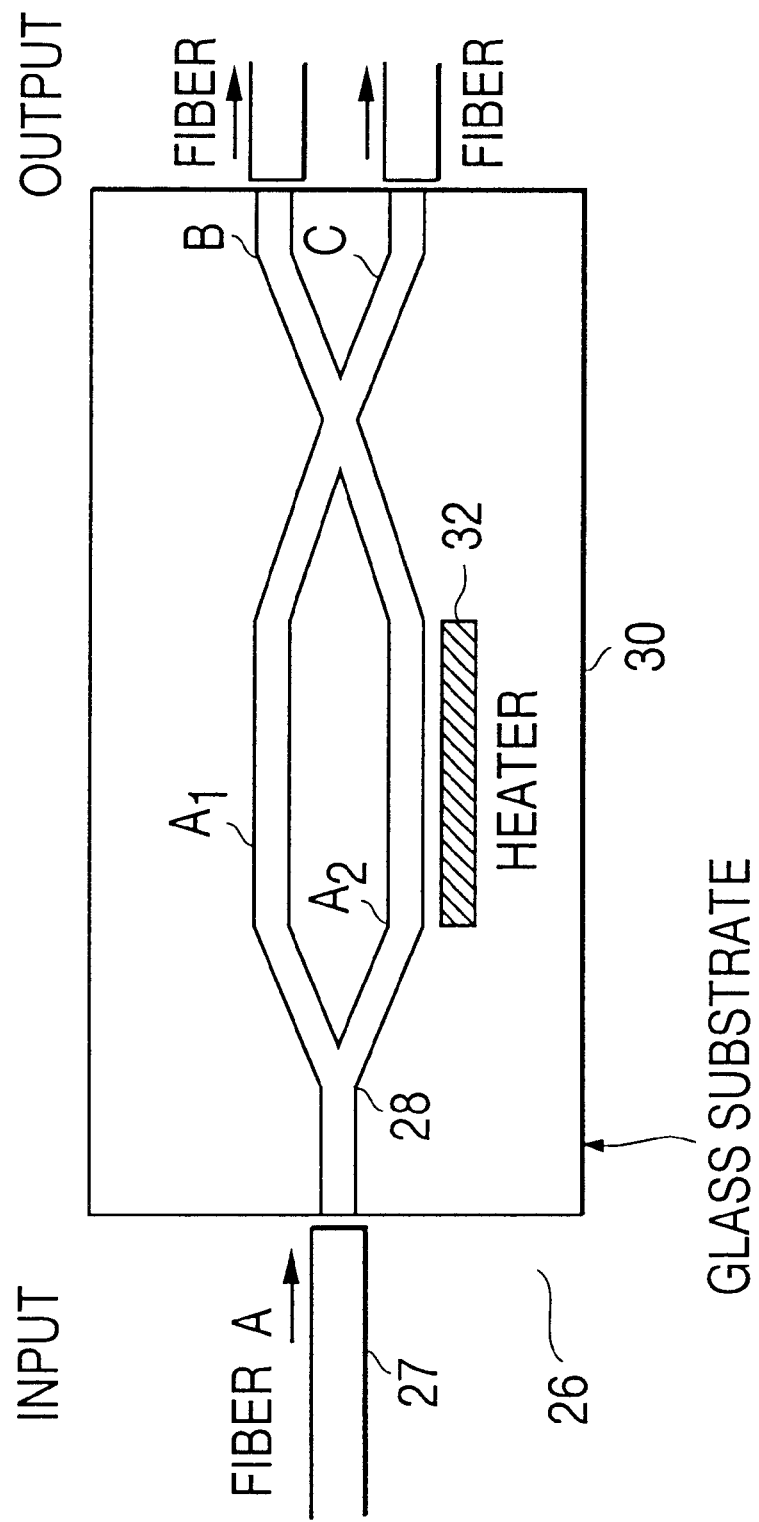
FIG. 3A shows a Mach-Zehnder interferometer switch of the prior art.

Therefore, an optical phase controller and optical switch which includes the heater 40 of the present invention coating a fiber 42 as shown in FIG. 5 includes the advantage of a bulk Mach-Zehnder interferometer shown in FIG. 1 of having no polarization dependence, and the advantage of a Mach-Zehnder interferometer switch 26 (including waveguide 28) shown in FIG. 3 of providing a quick temperature change resulting in a fast switching speed.

Figure 6A:
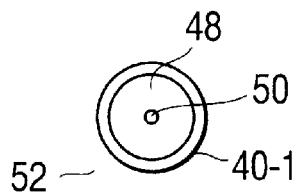
FIGS. 6A, 6B, and 6C show a variety of configurations for the heater of the present invention coating an optical fiber.
Figure 6B:
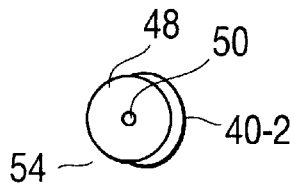
Figure 6C:
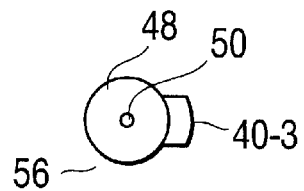
Figure 4A:
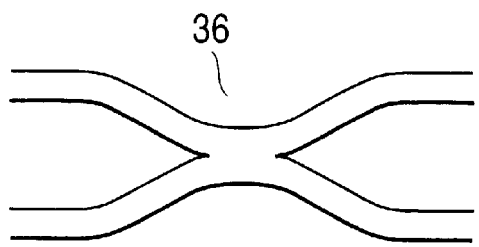
FIGS. 4A and 4B show the structure of 3-dB couplers of the prior art.
Figure 4B:
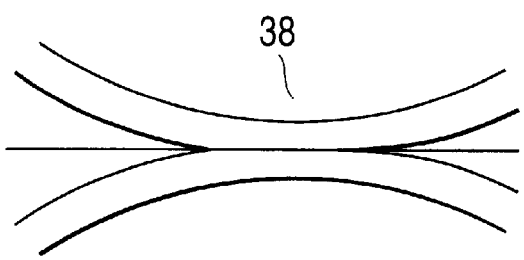

A variety of configurations for the heater 40 of the present invention coating an optical fiber are shown in FIGS. 6A, 6B, and 6C. In FIGS. 6A, 6B, and 6C, a conventional optical fiber is formed of cladding 48 surrounding a core 50. FIG. 6A shows an optical fiber 52 in which the cladding 48 is coated or surrounded entirely by a heater 40-1 of the present invention. FIG. 6B shows an optical fiber 54 in which half of the cladding 48 is coated by a heater 40-2 of the present invention. FIG. 6C shows an optical fiber 56 in which a heater 40-3 of the present invention is attached to a portion of the cladding 48 of the optical fiber.

Figure 7A:
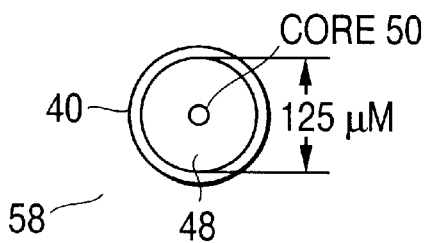
FIG. 7A shows a normal optical fiber coated by the heater of the present invention.

The smaller the cross-section of the fiber, the faster the temperature of the fiber is changed because the fiber includes a smaller area in which the temperature must be changed. An optical fiber 58 coated by the heater 40 of the present invention is shown in FIG. 7A. In the optical fiber 58 shown in FIG. 7A, the diameter of the core is approximately 10 micrometers, and the diameter of the cladding is approximately 125 micrometers.

Figure 7B:
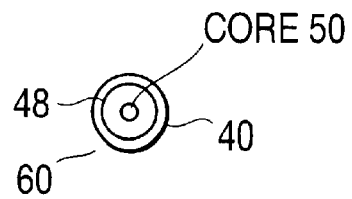
FIG. 7B shows an optical fiber smaller than normal coated by the heater of the present invention.

Alternatively, an optical fiber 60 coated by the heater 40 of the present invention can be made much smaller as shown in FIG. 7B. The optical fiber 60 shown in FIG. 7B can be made thinner than the optical fiber 58 shown in FIG. 7A, either by first constructing the optical fiber 58 then chemically etching the cladding 48 of the fiber or by making a thinner fiber from the outset. Both techniques are well-known in the art. The core size 50 remains the same in FIG. 7B as in FIG. 7A. The heater 40, surrounding the cladding 48, is made by coating or plating the fiber 58 or 60. With a thinner fiber (either through etching or by making the fiber thinner from the outset), the heat from the heater 40 of the present invention raises the temperature of the core 50 more quickly than in a fiber of normal size, changing the optical phase of the light traveling through the thinner fiber more quickly, and, accordingly, contributing to a faster switching speed for light traveling in an optical switch made with the heater 40 of the present invention.

FIGS. 8–15 show optical switches of the present invention. Before each of the optical switches shown in FIGS. 8–15 is explained in detail, several concepts which pertain to all of the optical switches shown in FIGS. 8–15 are presented.

The optical switches of the present invention shown in FIGS. 8–15 are implemented using optical fibers 42 and include the heater 40 of the present invention heating at least one of the optical fibers. The optical fibers 42 forming paths $P_1$ and $P_2$ included in the optical switches of the present invention shown in FIGS. 8–15 are relatively short in length (preferably between 1 mm and 50 mm, but most likely 2–3 cm., the length of which does not vary within each optical switch shown in FIGS. 8–15), and, therefore, maintains the polarization state of light traveling through the optical fibers in paths $P_1$ and $P_2$.

Figure 8:
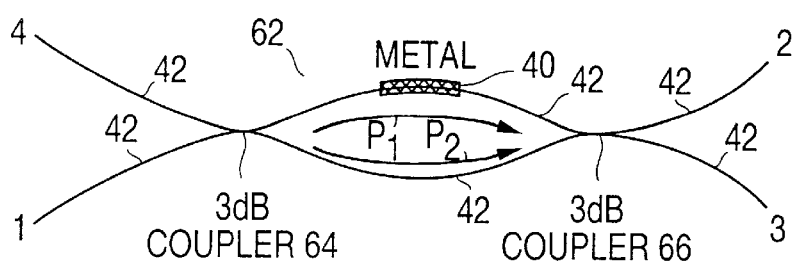
FIG. 8 shows a fundamental optical switch (a Mach-Zehnder interferometer) of the present invention.
Figure 15:
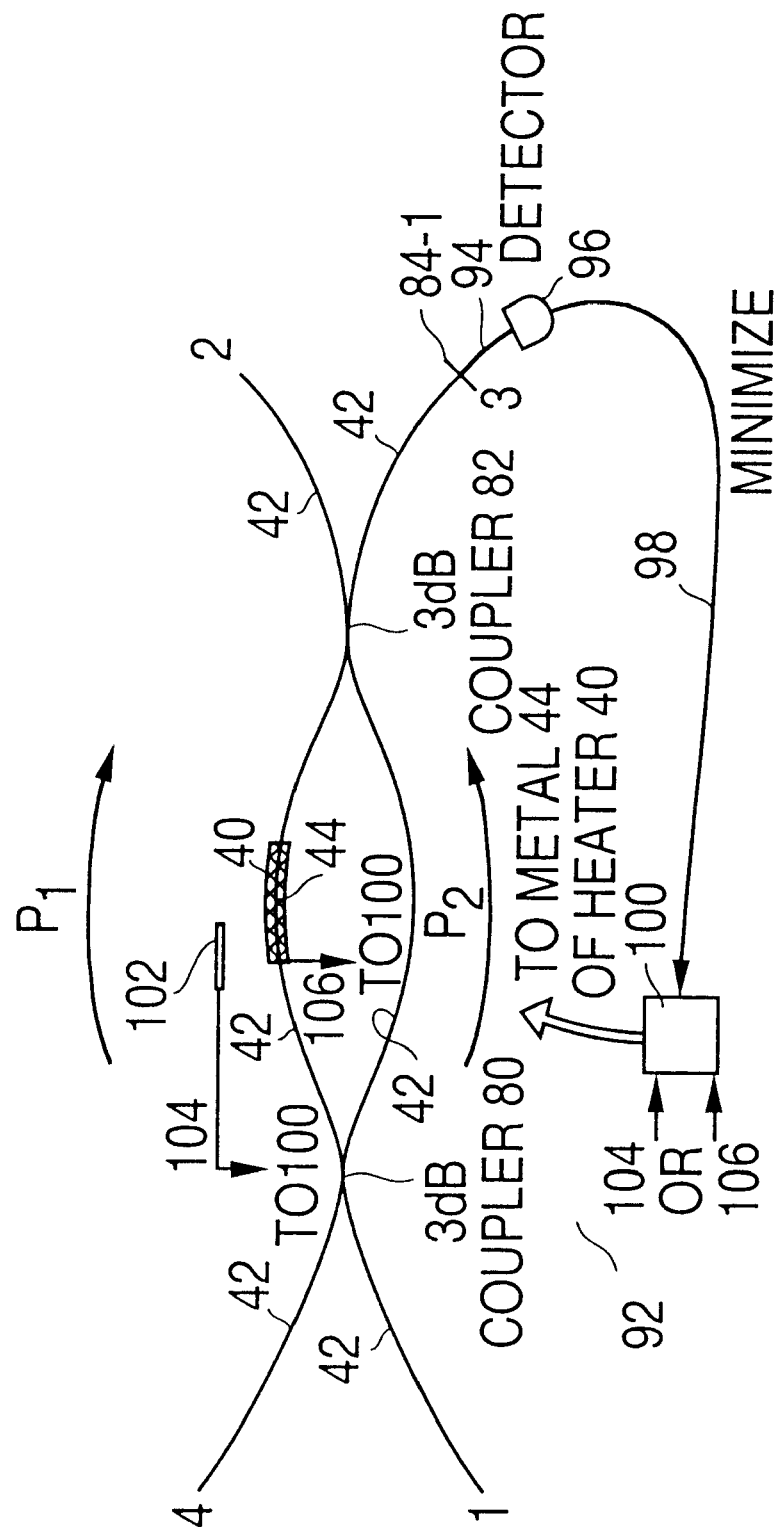
FIG. 15 shows an optical switch of the present invention having feedback control of the heater of the present invention.

In FIGS. 8–15, paths $P_1$ and $P_2$ are the paths into which the input light is divided by 3-dB couplers respectively shown in FIGS. 8–15. Paths $P_1$ and $P_2$ extend between both of the 3-dB couplers 64 and 66 shown in FIGS. 8 and 12, and the output path of the respective optical switches shown in FIGS. 8 and 12 is determined by the relative optical phase of the light traveling the paths $P_1$ and $P_2$ at 3-dB coupler 66. Paths $P_1$ and $P_2$ extend between both of the 3-dB couplers 80 and 82 shown in FIGS. 11, 14, and 15 and the output path of the respective optical switches shown in FIGS. 11, 14, and 15 is determined by the relative optical phase of the light traveling the paths $P_1$ and $P_2$ at 3-dB coupler 82.

Figure 9:
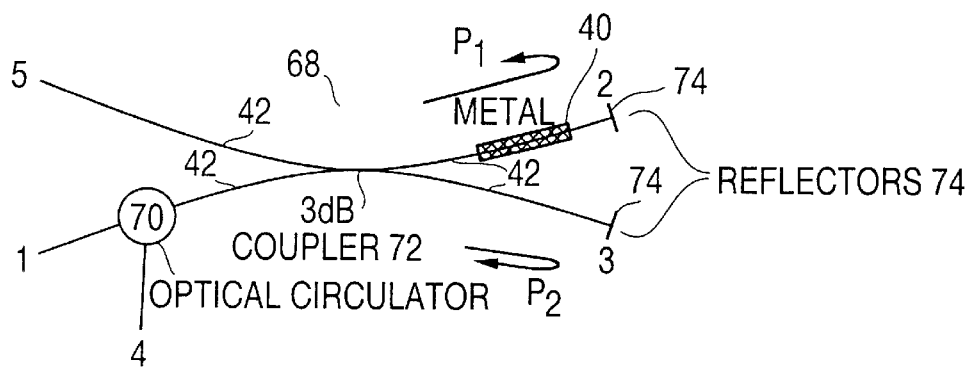
FIG. 9 shows another optical switch of the present invention.
Figure 10:
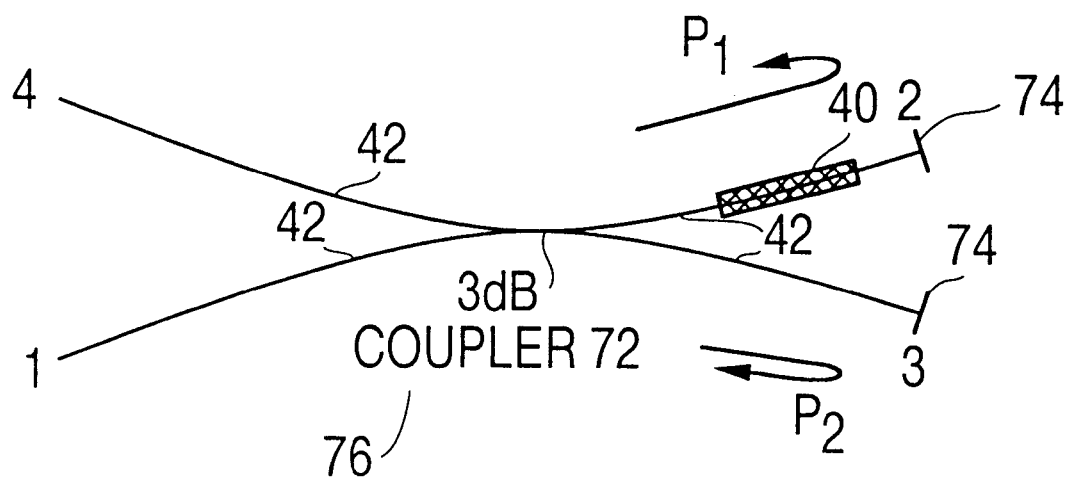
FIG. 10 shows a Michelson interferometer of the present invention.

In FIGS. 9, 10, and 13, paths $P_1$ and $P_2$ extend from 3-dB coupler 72 to reflectors 74 and back to 3-dB coupler 72, and the output path of the respective optical switches shown in FIGS. 9, 10, and 13 is determined by the relative optical phase of the light traveling the paths $P_1$ and $P_2$ by 3-dB coupler 72 after the light has been reflected back to 3-dB coupler 72 by reflectors 74.

The optical switches of the present invention shown in FIGS. 8–15 are constructed such that when the temperature of the optical fibers forming the paths $P_1$ and $P_2$ is the same in both optical paths $P_1$ and $P_2$, the light traveling in optical path $P_1$ is in-phase with the light traveling in optical path $P_2$. However, the optical switches of the present invention shown in FIGS. 8–15 could be constructed such that when the temperature of the optical fibers forming the paths $P_1$ and $P_2$ is the same in both optical paths $P_1$ and $P_2$, the light traveling in optical path $P_1$ is in opposite-phase with the light traveling in optical path $P_2$, or is an arbitrary phase with respect to the light traveling in optical path $P_2$.

The light from path $P_1$ is in-phase with the light from path $P_2$ when the phases of the light traveling in $P_1$ and $P_2$ differ by 0 radians or an integer multiple of $2\pi$ radians. The light from path $P_1$ is out-of-phase with the light from path $P_2$ when the phases of the light traveling in $P_1$ and $P_2$ differ by $\pi/2$ radians or an odd-number multiple of $\pi/2$ radians. The light from path $P_1$ is in opposite phase with the light from path $P_2$ when the phases of the light traveling in $P_1$ and $P_2$ differ by $\pi$ radians or an odd-number multiple of $\pi$ radians.

The optical switches of the present invention shown in FIGS. 8–15 are explained in detail.

FIG. 8 shows a fundamental optical switch 62 of the present invention. The optical switch 62 is a Mach-Zehnder interferometer and includes optical fibers 42 as described herein above. The above-mentioned heater 40 of the present invention coats a portion of one of the optical fibers 42, also as described herein above, at a location between 3-dB couplers 64 and 66, as shown in FIG. 8, and changes the relative phase of light traveling in paths $P_1$ and $P_2$ of switch 62 by heating the fiber 42 of path $P_1$.

The optical switch 62 shown in FIG. 8 is a 2×2 switch, having 2 input ports (or fibers) 1 and 4, and 2 output ports (or fibers) 2 and 3. When the relative optical phase of the input light 1 traveling in paths $P_1$ and $P_2$ between the 3-dB coupler 64 and the 3-dB coupler 66 is zero (in-phase), the input light 1 travels through the switch 62 to output 3. Likewise, when the relative optical phase of the input light 4 traveling in paths $P_1$ and $P_2$ between the 3-dB coupler 64 and the 3-dB coupler 66 is zero (in-phase), the input light 4 travels through the switch 62 to output 2.

When the relative optical phase of the light traveling in paths $P_1$ and $P_2$ between the 3-dB couplers 64 and 66 is $\pi$ radians (opposite phase) for both input light 1 and input light 4, on the other hand, the light travels from input 1 to output 2 and from input 4 to output 3.

The relative optical phase between the 3-dB couplers 64 and 66 for input light 1 and input light 4 is changed using the heater 40 of the present invention. When the optical fiber 42 coated by the heater 40 of the present invention in path $P_1$ is heated by the heater 40, the refractive index of the material contained in the optical fiber of path $P_1$ is changed, and, accordingly, the optical phase of light traveling between the 3-dB couplers 64 and 66 is changed over that of when the optical fiber in path $P_1$ is not heated. Therefore, the output light from switch 62 can be switched between outputs 2 and 3.

The optical switch 62 of the present invention has advantages over optical switches of the prior art. More particularly, since the switch 62 includes optical fibers 42, the switch 62 can be easily connected to transmission optical fibers with low insertion loss. Further, since the length between the 3-dB couplers 64 and 66 is relatively short, the polarization state of the light traveling between the 3-dB couplers 64 and 66 is maintained from one 3-dB coupler 64 to the other 3-dB coupler 66.

A similar function achieved by the switch 62 shown in FIG. 8 is obtained by the optical switch 68 of the present invention shown in FIG. 9. The optical switch 68 of FIG. 9 includes a 1 by 2 function, having 1 input fiber 1 and two output fibers 4 and 5. The input light from input fiber 1 travels through the optical circulator 70 to the 3-dB coupler 72, which divides the input light 1 into paths $P_1$ and $P_2$ traveling in arms 2 and 3, respectively. The light in the two paths $P_1$ and $P_2$ (arms 2 and 3) is reflected by conventional optical reflectors 74 back to the 3-dB coupler 72. Then the reflected light travels to either output fiber 5 or to the optical circulator 70, depending upon the relative optical phase of the light reflected light in the two arms 2 and 3 at 3-dB coupler 72. The light returning to the optical circulator 70 exits to the fiber 4.

In the optical switch 68 of the present invention shown in FIG. 9, the light entering the switch 68 from input fiber 1 exits to either output fiber 5 or output fiber 4, depending upon the relative phase between the light reflected in paths $P_1$ and $P_2$ of arms 2 and 3, respectively. If the relative phase between the light traveling in paths $P_1$ and $P_2$ (arms 2 and 3) is in-phase, then the light is output to output port 4, whereas if the relative phase between the light traveling in paths $P_1$ and $P_2$ (arms 2 and 3) is opposite phase, then the light is output to output port 5.

Alternatively, if the optical circulator 70 is removed, the input light 1 will either travel to the other fiber (output fiber 5) or will be reflected back to the same fiber (input fiber 1).

The relative phase between the light reflected in paths $P_1$ and $P_2$ (arms 2 and 3) is determined by heater 40 of the present invention. In the switch 68 of FIG. 9, the heater 40 coats the fiber 42 of path $P_1$ (arm 2). However, the heater 40 could alternatively coat the fiber 42 of path $P_2$ (arm 3). In the switch 68 of FIG. 9, when the heater 40 of the present invention heats the fiber of path $P_1$ (arm 2), the relative phase between the light traveling in path $P_1$ (arm 2) and the light traveling in path $P_2$ (arm 3) is changed, and, accordingly, the output is switched between output fiber 4 and output fiber 5.

The structure of an optical switch in which the input light from an input fiber is either reflected back to the input fiber or transmitted to the other output fiber depending on the optical phase between two arms is referred to as a Michelson interferometer, which is well-known in the art. The optical switch 68 of the present invention, though, shown in FIG. 9 includes the heater 40 of the present invention which changes the relative phase of the light traveling in paths $P_1$ and $P_2$ (arms 2 and 3) of the optical switch 68.

The functions of the switches 62 and 68 shown, respectively, in FIGS. 8 and 9, are similar to each other in that light from an input fiber to the switch is switched between one of two output fibers from the switch, and neither of the two output fibers is the same as the input fiber.

As will be seen, the functions of switches 76 and 78 shown, respectively, in FIGS. 10 and 11, are similar to each other in that light from one of the input fibers to the switch is switched between one of two output fibers from the switch, and one of the two output fibers is the same as the input fiber inputting the input light. However, the performance of switches 76 and 78 differ from each other in that switch 78 has less crosstalk than switch 76.

FIG. 10 shows another optical switch 76 of the present invention, including heater 40 of the present invention. In the optical switch 76, light is input through input fiber 1 and is split by conventional 3-dB coupler 72 to travel to paths $P_1$ and $P_2$ (arms 2 and 3). Path $P_1$ (arm 2) includes heater 40 of the present invention, previously described herein above. The heater 40 changes the relative phase of the light traveling in paths $P_1$ and $P_2$ (arms 2 and 3) by heating the fiber 42 in path $P_1$ (arm 2), consistent with the principles described herein above.

Both paths $P_1$ and $P_2$ (arms 2 and 3) of the switch 76 include conventional optical reflectors 74, reflecting the light traveling in the respective arms. Depending upon the relative phase between the reflected light in paths $P_1$ and $P_2$ (arms 2 and 3), the output light is directed by 3-dB coupler 72 to either output port 4 or back to input port 1. More particularly, the input light from input port 1 is transmitted by 3-dB coupler 72 to paths $P_1$ and $P_2$ (arms 2 and 3), and is reflected by conventional reflectors 74 back to 3-dB coupler 72. If, when the light is reflected back to 3-dB coupler 72 in paths $P_1$ and $P_2$ (arms 2 and 3) by reflectors 74, the reflected light is in-phase, then the light is transmitted by 3-dB coupler 72 to input port 1. If, on the other hand, the relative phase is $\pi$ radians (opposite-phase) when the input light from input port 1 is reflected by conventional reflector 74 back to 3-dB coupler 72, then the reflected light is transmitted to 3-dB coupler 72 to output port (fiber) 4.

Likewise, if the input light is input through fiber 4, the input light 4 is transmitted by 3-dB coupler 72 to paths $P_1$ and $P_2$ (arms 2 and 3), and is reflected by conventional reflectors 74 back to 3-dB coupler 72. If, when the light is reflected back to 3-dB coupler 72 in paths $P_1$ and $P_2$ (arms 2 and 3) by reflectors 74, the reflected light is in-phase, then the light is transmitted by 3-dB coupler 72 to input 4. If, on the other hand, the relative phase is $\pi$ radians (opposite-phase) when the input light 4 is reflected by conventional reflector 74 back to 3-dB coupler 72, then the reflected light is transmitted to 3-dB coupler 72 to input port (fiber) 1.

The relative phase between the light traveling in paths $P_1$ and $P_2$ is determined by whether the fiber 42 of path $P_1$ is heated by heater 40 of the present invention. If the fiber 42 of path $P_1$ is heated by heater 40, then the light traveling in paths $P_1$ and $P_2$ will be in opposite phase, and, if the fiber 42 of path $P_1$ is not heated or is heated to a different temperature by heater 40, then the light traveling in paths $P_1$ and $P_2$ will be in-phase.

The function of the switch 76 shown in FIG. 10 is to switch the output of input light 1 between the input fiber 1 and another output fiber 4.

There are many applications for the optical switch 76, including echo canceling, etc.

In some applications using the above functions, in which the input light is either reflected back to the input fiber or is emitted into another output fiber, very low crosstalk (or leaked light) is allowed. More particularly, in an ideal switch, when the input light from input fiber 1 travels to the other output fiber 4, even a small reflection of the light back to the input fiber 1 is not allowed. However, the switch 76 (and switches like it) are not ideal. For example, imperfections in the 3-dB coupler 72 may result in the ratio of the light split between paths $P_1$ and $P_2$ (arms 2 and 3) being in a ratio other than 50-50 (half of the power from the input light being evenly distributed between the two paths $P_1$ and $P_2$ (arms 2 and 3)), such as a ratio of 49 to 51. By way of another example, the relative phase between the light traveling in paths $P_1$ and $P_2$ (arms 2 and 3) may not be precisely in-phase or precisely opposite-phase with each other. Both of the foregoing conditions result in undesired light such as crosstalk, or leaked light, being returned to the input fiber when the phase condition is opposite phase. In reality, because of crosstalk in the switch 76 of FIG. 10, when light is input through port 1, and the light in paths $P_1$ and $P_2$ (arms 2 and 3) is supposed to be in opposite-phase, perhaps 99% of the reflected light is output to port 4 and 1% ($10^{-2}$) of the reflected light is leaked to input port 1.

The optical switch 78 of the present invention, including heater 40 of the present invention, shown in FIG. 11 reduces the amount of crosstalk returned to the input fiber. The switch 78 shown in FIG. 11 is a 1×2 switch with the input fiber 1 and the output fibers 1 and 2, with logic consistent with the logic of the Mach-Zehnder interferometer optical switch 62 shown in FIG. 8.

Because the optical switch 78 of the present invention shown in FIG. 11 is a reciprocal device (unlike an optical switch including an optical circulator, which is a non-reciprocal device), light input from input port 1 travels to arm 3 through conventional 3-dB couplers 80 and 82 if the light traveling in paths $P_1$ and $P_2$ is in-phase, or to output port 2 if the light traveling in paths $P_1$ and $P_2$ is in opposite phase.

If the light traveling in paths $P_1$ and $P_2$ is in-phase, then light input from input port 1 travels to arm 3, and is reflected back to input port 1.

On the other hand, if the light traveling in paths $P_1$ and $P_2$ is in opposite-phase, then light input from input port 1 travels to output port 2, and is output by the switch 78.

The heater 40 of the present invention determines whether the light traveling in paths $P_1$ and $P_2$ is in-phase or is in opposite phase, by heating the fiber 42 of path $P_1$ (making the light in paths $P_1$ and $P_2$ in opposite phase) to a certain temperature or not heating the fiber 42 of path $P_1$ (making the light in paths $P_1$ and $P_2$ in-phase).

As discussed herein above, in the optical switch 78 shown in FIG. 11, when the input light input from input port (or fiber) 1 travels to arm (or fiber) 3 via conventional 3-dB couplers 80 and 82, and the light traveling in paths $P_1$ and $P_2$ is in-phase, the light is reflected by reflector 84 and returned to input port (or fiber) 1. The fact that light is returned to fiber 1 in this instance (when the light traveling in paths $P_1$ and $P_2$ is in-phase) is not an example of crosstalk. More particularly, when the light traveling in paths $P_1$ and $P_2$ is in-phase, it is desired that light from input port 1 is reflected back to the same input port 1.

The issue of reducing crosstalk by preventing input light from returning to the input port of switch 78 is more important when the light traveling in paths $P_1$ and $P_2$ is opposite phase than when it is in-phase. More particularly, in the switch 78, when the light from the input port 1 travels to the other output port 2 (the light traveling in paths $P_1$ and $P_2$ is opposite phase), there should be no reflection of the light back to input port 1. In reality, because of crosstalk (or leaked light) present in the switch 78 (due mainly to the 3-dB couplers 80 and 82), perhaps 99% of the light from input port 1 travels to output port 2, and a small portion of the input light (perhaps 1%) travels to arm 3. The 1% of the light traveling to arm 3 is reflected back, and, because the light in paths $P_1$ and $P_2$ is opposite phase, most of the reflected light (99% of the 1%) travels to port 4 and is output by the switch 78. The other 1% of the light reflected by reflector 84 travels back to input port 1. Therefore, the overall crosstalk of the light input from port 1 is 1% of 1% of the input light, or 0.01%.

If the crosstalk of the switch 78 is 1%, the reflected light into the port 1 is 0.01% because the light reflected into port 1 from arm 3 must traverse the switch 78 twice, passing each of 3-dB couplers 80 and 82 twice (meaning that the switch 78 is a 2-stage device). The crosstalk of the switch 78 is 1% of 1% which is equal to 0.01% (or $10^{-4}$).

Switch 76 of FIG. 10 and switch 78 of FIG. 11 both provide similar functions to each other, to switch input light to be output by the switch back to the input port or to another output port. However, since the switch 76 is a 1-stage device, the crosstalk of the switch 76 shown in FIG. 10 is 1% (or $10^{-2}$). Since the switch 78 is a 2-stage device, the crosstalk of the switch 78 shown in FIG. 11 is 0.01% (or $10^{-4}$).

Optical switch 62 shown in FIG. 8, optical switch 68 shown in FIG. 9, optical switch 76 shown in FIG. 10, and optical switch 78 shown in FIG. 11 each include two arms of which only one of the arms includes the heater 40 of the present invention. The relative phase of the light traveling in the two arms of each of the above-mentioned switches is changed because the heater of the present invention heats the fiber carrying the light in the one of the two arms, thus changing the relative temperature between the optical fibers of the two arms. The heater of the present invention raises the temperature of the optical fiber quickly if the initial power provided to the heater is high. Then the light path is switched quickly because the relative optical phase is changed quickly. However, when the light path is to be switched back to its original state, time is required to cool the heated optical fiber down to a temperature consistent with the other (non-heated) optical fiber so that the relative optical phase of the light traveling in the two fibers is returned to its original (non-heated) value. Because the relative optical phase between the light traveling in the two arms of the switch can be changed more quickly in heating the optical fiber in one of the two arms than in cooling the previously-heated optical fiber, the switching time is shorter (or faster) in one direction than in the other direction. Therefore, the optical switch operates faster in switching the output light to one port than to another port.

To avoid the problem of a longer switching time in one direction than in the other, heaters of the present invention are provided in both arms of the optical switches, as shown in optical switches of the present invention of FIGS. 12, 13, and 14.

Since the output light path of the switch is switched by changing the optical phase between the two arms (or paths $P_1$ and $P_2$), which is determined by the temperature difference between the two arms (or paths $P_1$ and $P_2$), the temperature in the second arm (path $P_2$) is raised by the heater of the present invention instead of waiting for the temperature of the first (initially-heated) optical fiber (path $P_1$) to cool down. When the temperature of the fibers in both arms (paths $P_1$ and $P_2$) is raised, there is no difference in the temperature between the optical fibers of the two arms (paths $P_1$ and $P_2$), and, therefore, the relative phase of the light traveling in the two arms (paths $P_1$ and $P_2$) is the same as the relative phase of the light traveling in the two arms (paths $P_1$ and $P_2$) would be if neither fiber were heated.

Of course, after the switching of the light path has occurred, the temperature of the second fiber (path $P_2$) should cool down as the temperature of the original (first) fiber (path $P_1$) cools down.

FIG. 12 shows an optical switch 86 of the present invention corresponding to the optical switch 62 of the present invention shown in FIG. 8. However, in the optical switch 86 of the present invention shown in FIG. 12, paths $P_1$ and $P_2$ both include a heater 40 of the present invention (indicated as heaters $40_1$ and $40_2$, respectively). The switching logic of switch 86 is the same as the switching logic of switch 62, and is not repeated herein in detail. Briefly, though, in switch 86 as in switch 62, when the optical phase of the light traveling in paths $P_1$ and $P_2$ is the same, then the light traveling between 3-dB couplers 64 and 66 is in-phase. If the subject light is in-phase, light entering the switch 86 through port 1 is switched to output port 3 and light entering the switch 86 through port 4 is switched to output port 2. If the optical phase of the light traveling in paths $P_1$ and $P_2$ is different by $\pi$ radians, then the light traveling between 3-dB couplers 64 and 66 is opposite phase. If the subject light is opposite phase, light entering the switch 86 through port 1 is switched to output port 2, and light entering the switch 86 through port 4 is switched to output port 3.

In the following descriptions, it is assumed that there is no optical phase bias before heating. This means, when the arms are at the same temperature, the optical phase of the light traveling in paths $P_1$ and $P_2$ is the same. In a practical device, however, there may be an optical phase bias, that is, there is a difference in optical phase of the light traveling in paths $P_1$ and $P_2$, even when the temperatures are the same. In this case, before the heating process for the switching, an electric current bias to the heater is applied. This bias current keeps the certain temperature difference between the arms so that the light traveling the arms is in-phase. Then, the current for heating is applied, in addition to this bias current. However, for the simpler explanation, this bias current is assumed to be zero in the discussion below.

The optical phase of the light traveling in paths $P_1$ and $P_2$ is in-phase when there is no temperature difference between the fibers of paths $P_1$ and $P_2$, and is opposite-phase when there is predetermined temperature differential between the fibers of paths $P_1$ and $P_2$. The predetermined temperature differential is discussed herein above.

In both of switch 62 and switch 86, the relative phase of the light traveling in paths $P_1$ and $P_2$ is switched from in-phase to opposite phase by heating the fiber of path $P_1$ to a temperature a predetermined amount above the temperature of the fiber of path $P_2$.

Unlike switch 62, though, instead of waiting for the heater 40 provided in switch 62 (and, therefore, the optical fiber of path $P_1$) to cool down to the same temperature as the optical fiber of path $P_2$, the heater $40_2$ is heated to the same temperature as heater $40_1$, making the light traveling in paths $P_1$ and $P_2$ in-phase. Therefore, the switching time of switch 86 is the same as that of switch 62 in switching the relative phase of the light traveling in paths $P_1$ and $P_2$ from in-phase to opposite phase, and is faster than the switching time of the switch 62 in switching the relative phase of the light traveling in paths $P_1$ and $P_2$ from opposite phase to in-phase.

The temperature differential, or relative temperature, between the paths $P_1$ and $P_2$ is discussed herein above, and must be a temperature change of approximately 10 degrees Celsius when the heater 40 (or $40_1$ or $40_2$) is 1 cm (centimeter) long to change the relative phase by $\pi$ radians.

Switches 88 of FIG. 13 and 90 of FIG. 14 also include two heaters $40_1$ and $40_2$ of the present invention, changing the relative temperature between the two paths $P_1$ and $P_2$ as discussed herein above with reference to FIG. 12.

In the switch 88 of FIG. 13, when the relative temperature of the fibers in paths $P_1$ and $P_2$ is zero (either by raising the temperature of heater $40_2$ to be the same as heater $40_1$ or by cooling both of heaters $40_1$ and $40_2$ to the same temperature), the light traveling in paths $P_1$ and $P_2$ is in-phase, and light input from port 1 travels through 3-dB coupler 72 to paths $P_1$ and $P_2$, is reflected, respectively, by reflectors 74 at ports 2 and 3 back through 3-dB coupler 72. The reflected light is output by port 4 from optical circulator 70. If optical circulator 70 were not included in optical switch 88 of FIG. 13 (as it is not in the switch 76 of FIG. 10), then the reflected light would be reflected back to port 1.

Also in the switch 88 of FIG. 13, when there is a temperature differential (as discussed herein above) of the fibers in paths $P_1$ and $P_2$ (either by raising the temperature of heater $40_1$ without raising the temperature of heater $40_2$ or vice-versa), such that the light traveling in paths $P_1$ and $P_2$ is of opposite-phase, then the light input from port 1 travels through 3-dB coupler 72 to paths $P_1$ and $P_2$, and is reflected, respectively, by reflectors 74 at ports 2 and 3 back through 3-dB coupler 72, and is output by port 5.

FIG. 14 shows an optical switch 90 of the present invention corresponding to the optical switch 78 of the present invention shown in FIG. 11. However, in the optical switch 90 of the present invention shown in FIG. 14, paths $P_1$ and $P_2$ both include a heater 40 of the present invention (indicated as heater $40_1$ and $40_2$). The switching logic of switch 90 is the same as the switching logic of switch 78, and is not repeated herein in detail. Briefly, though, in switch 90 as in switch 78, when the optical phase of the light traveling in paths $P_1$ and $P_2$ is the same, then the light traveling between 3-dB couplers 80 and 82 is in-phase. If the subject light is in-phase, light entering the switch 90 through port 1 is switched to output port 3 (which includes reflector 84) and is reflected back to input port 1. If the optical phase of the light traveling in paths $P_1$ and $P_2$ is different by $\pi$ radians, then the light traveling between 3-dB couplers 80 and 82 is in opposite phase. If the subject light is in opposite phase, light entering the switch 90 through port 1 is switched to output port 2.

The optical phase of the light traveling in paths $P_1$ and $P_2$ is in-phase when there is no temperature difference between the fibers of paths $P_1$ and $P_2$, and is in opposite-phase when there is predetermined temperature differential between the fibers of paths $P_1$ and $P_2$ (as discussed herein above).

In both of switch 78 and switch 90, the relative phase of the light traveling in paths $P_1$ and $P_2$ is switched from in-phase to opposite phase by heating the fiber of path $P_1$ to a temperature above the temperature of the fiber of path $P_2$ (as discussed herein above).

Unlike switch 78, though, instead of waiting for the heater 40 provided in switch 78 (and, therefore, the optical fiber of path $P_1$) to cool down to the same temperature as the optical fiber of path $P_2$, the heater $40_2$ may be heated to the same temperature as heater $40_1$ so that the light traveling in paths $P_1$ and $P_2$ would be in-phase. Therefore, the switching time of switch 90 is the same as that of switch 78 in switching the relative phase of the light traveling in paths $P_1$ and $P_2$ from in-phase to opposite phase, and is faster than the switching time of the switch 78 in switching the relative phase of the light traveling in paths $P_1$ and $P_2$ from opposite phase to in-phase.

The temperature differential, or relative temperature, between the paths $P_1$ and $P_2$ is discussed herein above, and must be a temperature change of approximately 10 degrees Celsius when the heater 40 (or $40_1$ or $40_2$) is 1 cm long to change the relative phase by $\pi$ radians.

There are at least two methods (an optical method and a temperature-sensing method) to monitor the fiber 42 coated or plated by the heater 40 of the present invention to control the temperature of the fiber so that the optical phase through the fiber is correctly maintained as in-phase or as opposite phase. Both of the methods involve feedback control of the heater(s) heating the fiber(s), and are explained with reference to FIG. 15 using only one heater 40 of the present invention, previously described. However, the application of the two methods can be extended to two heaters $40_1$ and $40_2$, previously described. The interferometer (or optical switch) 92 of the present invention shown in FIG. 15 is similar to the optical switches of the present invention shown in FIGS. 11 and 14.

The optical method is explained with reference to FIG. 15. As shown in FIG. 15, a portion of signal light extending to port 3 or another light at a different wavelength which is injected from the light path of port 1 or 4 is transmitted along path 94 and is detected after the mirror 84-1 by conventional detector 96. If the mirror reflectivity for the signal light is not 100%, a small transmission of light may occur through mirror 84-1, and the detector 96 detects the small transmission of light and measures the amount of power included in the transmission of light along path 94. Typically, 1–2% of the light reaching mirror 84-1 is transmitted through mirror 84-1. When another light at a different wavelength is used, the mirror reflectivity is ideally 0% for this light and 100% for signal light.

The amount of power included in the transmission of light along path 94, also referred to as the detected power, is transmitted via path 98 to the heater controller 100. The heater controller 100 then regulates the amount of power transmitted to the heater 40 to increase or to decrease the amount of heat applied to the fiber 42 based upon the detected power.

If the light traveling in paths $P_1$ and $P_2$ of optical switch 92 is to be in-phase, then heater controller 100 controls the heater 40 to maximize or minimize the amount of detected power in path 94 when the light comes from 1 or 4, respectively.

Alternatively, if the light traveling in paths $P_1$ and $P_2$ of optical switch 92 is to be in opposite-phase, then heater controller 100 controls the heater 40 to minimize or maximize the amount of detected power in path 94 when the light comes from 1 or 4, respectively.

Since the relative optical phase at any particular moment in time is not directly known, the above-mentioned detector 96 and heater controller 100 can also be used to determine whether the light traveling in paths $P_1$ and $P_2$ is in-phase or is in opposite-phase in the optical switch 92 by detecting the amount of power included in path 94.

Another method of monitoring the fiber is to sense and measure the fiber 42 temperature. A thermometer 102 can be installed beside the fiber, and the output 104 of the thermometer could be transmitted to the heater controller 100, which would then regulate the amount of power transmitted to the heater 40 based upon the output 104. Alternatively, the resistant metal 44 included in the heater 40 can be used as a thermometer. Since the resistance of metal is a function of the temperature, the fiber 42 temperature can be monitored by measuring the resistance of the metal included in the heater 40 by signal 106 transmitted to the heater controller 100. Likewise, the heater controller 100 would then regulate the amount of power transmitted to the heater 40 based upon the signal 106.

In the Mach-Zehnder interferometer of the present invention, each of the 3-dB couplers comprises optical fibers melted after the optical fibers are twisted or optical fibers contacted after the optical fibers are shaved. Moreover, in the Michelson interferometer of the present invention, each of the 3-dB couplers comprises optical fibers melted after the optical fibers are twisted or optical fibers contacted after the optical fibers are shaved.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A Mach-Zehnder interferometer comprising:
   optical fibers forming arms of the interferometer; and
   3-dB couplers splitting input light between the arms and recombining light from the arms into output paths, wherein one of the arms includes a heater formed on the surface of the bare fiber and heating the one of the arms.

2. The Mach-Zehnder interferometer as claimed in claim 1, wherein another arm of the Mach-Zehnder interferometer includes a heater formed on the surface of the bare fiber and heating the other arm.

3. The Mach-Zehnder interferometer as claimed in claim 1, wherein each of the 3-dB couplers comprises one of optical fibers melted after the optical fibers are twisted and optical fibers contacted after the optical fibers are shaved.

4. The Mach-Zehnder interferometer as claimed in claim 1, wherein the fiber length of each arm is between 1 mm and 50 mm.

5. The Mach-Zehnder interferometer as claimed in claim 1, wherein the heater comprises a coating or plating of a resistant metal on the optical fiber surface.

6. The Mach-Zehnder interferometer as recited in claim 5, wherein the heater comprises electrodes located on both ends of the metal causing electric current to flow in the metal along the optical fiber.

7. The Mach-Zehnder interferometer as claimed in claim 5, wherein the metal is gold.

8. The Mach-Zehnder interferometer as claimed in claim 5, wherein the length of heater is between 1 mm and 20 mm.

9. The Mach-Zehnder interferometer as claimed in claim 5, wherein the thickness of the metal is between 0.1 $\mu$m and 50 $\mu$m.

10. The Mach-Zehnder interferometer as claimed in claim 5, wherein the metal is formed on one of the entire surface, the half of the surface, and a portion of the surface in the cross-section of the optical fiber.

11. The Mach-Zehnder interferometer as claimed in claim 5, wherein the optical fiber to which the heater is attached is etched to make the fiber thinner and to change the fiber temperature more quickly.

12. The Mach-Zehnder interferometer as claimed in claim 1, wherein the optical phase difference of the light traveling in arms of the interferometer is monitored by using either a signal light or another light at a different wavelength injected from the light path.

13. The Mach-Zehnder interferometer as claimed in claim 1, wherein the heater comprises metal and the optical phase difference between the arms is monitored by measuring the resistance of the metal of the heater.

14. A Michelson interferometer comprising:
    optical fibers forming arms of the interferometer; and
    a 3-dB coupler splitting input light between the arms and recombining light from the arms into output paths, wherein one of the arms includes a heater formed on the surface of the bare fiber and heating the one of the arms.

15. The Michelson interferometer as claimed in claim 14, wherein another of the arms includes a heater formed on the surface of the bare fiber and heating the another arm.

16. The Michelson interferometer as claimed in claim 14, wherein each of the 3-dB couplers comprises one of optical fibers melted after the optical fibers are twisted and optical fibers contacted after the optical fibers are shaved.

17. The Michelson interferometer as claimed in claim 14, wherein the fiber length of the arm is between 1 mm and 50 mm.

18. The Michelson interferometer as claimed in claim 14, wherein the heater comprises coating or plating of a resistant metal on the optical fiber surface.

19. The Michelson interferometer as claimed in claim 18, wherein the heater comprises electrodes located on both ends of the metal causing an electric current to flow in the metal along the optical fiber.

20. The Michelson interferometer as claimed in claim 18, wherein the metal is gold.

21. The Michelson interferometer as claimed in claim 18, wherein the length of heater is between 1 mm and 20 mm.

22. The Michelson interferometer as claimed in claim 18, wherein the thickness of the metal is between 0.1 $\mu$m and 50 $\mu$m.

23. The Michelson interferometer as claimed in claim 18, wherein the metal is formed on one of the entire surface, half of the surface, and a portion of the surface in the cross-section of the optical fiber.

24. The Michelson interferometer as claimed in claim 18, wherein the optical fiber to which the heater is attached is etched to make the fiber thinner and to change the fiber temperature more quickly.

25. The Michelson interferometer as claimed in claim 14, wherein the optical phase difference of the light traveling in arms of the interferometer is monitored by using either a signal light or another light at a different wavelength injected from the light path.

26. The Michelson interferometer as claimed in claim 14, wherein the heater comprises metal and the optical phase difference of the light traveling in arms of the interferometer is monitored by measuring the resistance of the metal.

27. An apparatus comprising:
    optical fibers transmitting light in optical paths;
    3-dB couplers, coupled to the optical fibers, splitting input light into the optical paths, and recombining output light from the optical paths into output paths; and
    a heater coating a portion of one of the optical fibers and heating the one of the optical fibers to change the optical phase of the light traveling in the one of the optical paths.

28. The apparatus as claimed in claim 27, further comprising a second heater coating a portion of another of the optical fibers and heating the another of the optical fibers to change the relative optical phase of the light traveling in the one of the optical paths and the another of the optical paths.

29. The apparatus as claimed in claim 27, further comprising:
    a detector coupled to one of the optical paths and detecting power of leaked light in the optical path; and
    a heater controller, coupled to the detector and to the heater, and controlling the heater based upon the power of the leaked light.

30. An optical switch comprising:
    optical fibers transmitting light in optical paths;

3-dB couplers, coupled to the optical fibers, splitting input light into the optical paths, and recombining output light from the optical paths into output paths; and a heater coating a portion of one of the optical fibers and heating the one of the optical fibers to change the optical phase of the light traveling in the one of the optical paths.

31. The switch as claimed in claim 30, further comprising a second heater coating a portion of another of the optical fibers and heating the another of the optical fibers to change the relative optical phase of the light traveling in the one of the optical paths and the another of the optical paths.

32. The switch as claimed in claim 30, further comprising:

a detector coupled to one of the optical paths and detecting power of leaked light in the optical path; and a heater controller, coupled to the detector and to the heater, and controlling the heater based upon the power of the leaked light.

33. The switch as claimed in claim 30, wherein the switch is a 1×2 switch.

34. The switch as claimed in claim 30, wherein the switch is a 2×2 switch.

35. A heater comprising one of a coating and a plating of a resistant metal on an optical fiber surface of an optical switch.

36. The heater as claimed in claim 35, further comprising electrodes located on both ends of the metal causing electric current to flow in the metal along the optical fiber.

37. The heater as claimed in claim 35, wherein the metal is gold.

38. The heater as claimed in claim 35, wherein the length of heater is between 1 mm and 20 mm.

39. The heater as claimed in claim 35, wherein the thickness of the metal is between 0.1 $\mu$m and 50 $\mu$m.

40. The heater as claimed in claim 35, wherein the metal is formed on one of the entire surface, the half of the surface, and a portion of the surface in the cross-section of the optical fiber.

41. The heater as claimed in claim 35, wherein the optical fiber to which the heater is attached is etched to make the fiber thinner and to change the fiber temperature more quickly.

42. An optical switch including an input port receiving input light and output ports outputting output light, said optical switch comprising:

a first optical fiber forming a first optical path;

a second optical fiber forming a second optical path;

a first 3-dB coupler coupled to the input port, to the first optical fiber, and to the second optical fiber, and splitting the input light between the first optical path and the second optical path;

a heater coating a portion of the first optical fiber and changing the optical phase of the light traveling in the first optical path with respect to the light traveling in the second optical path by heating the first optical fiber; and a second 3-dB coupler coupled to the first optical fiber and to the second optical fiber and recombining the light traveling in the first optical path with the light traveling in the second optical path into the output light, and outputting the output light to one of the output ports if the light traveling in the first optical path is in-phase with the light traveling in the second optical path, and outputting the output light to another of the output ports if the light traveling in the first optical path is in opposite-phase with the light traveling in the second optical path.

43. The optical switch as claimed in claim 42, further comprising a heater coating the second optical fiber and changing the optical phase of the light traveling in the second optical path to match the optical phase of the light traveling in the first optical path by heating the second optical fiber.

44. The optical switch as claimed in claim 42, wherein the length of each optical path is less than ½ meter.

45. An optical switch including input ports receiving input light and output ports outputting output light, said optical switch comprising:

a first optical fiber forming a first optical path;

a second optical fiber forming a second optical path;

a first 3-dB coupler coupled to the input ports, to the first optical fiber, and to the second optical fiber, and splitting the input light between the first optical path and the second optical path;

a heater coating a portion of the first optical fiber and changing the optical phase of the light traveling in the first optical path with respect to the light traveling in the second optical path by heating the first optical fiber;

a second 3-dB coupler coupled to the first optical fiber and to the second optical fiber and recombining the light traveling in the first optical path with the light traveling in the second optical path into the output light, and outputting the output light to one of the output ports if the light traveling in the first optical path is in-phase with the light traveling in the second optical path, and outputting the output light to another of the output ports if the light traveling in the first optical path is in opposite-phase with the light traveling in the second optical path; and a reflector placed at a terminating end of the one of the output ports and reflecting the output light back through the switch to another of the input ports if the phase of the light traveling in the first optical path is in opposite-phase with the light traveling in the second optical path.

46. The optical switch as claimed in claim 45, further comprising a heater coating the second optical fiber and changing the optical phase of the light traveling in the second optical path to match the optical phase of the light traveling in the first optical path by heating the second optical fiber.

47. The optical switch as claimed in claim 45, wherein the length of each optical path is less than ½ meter.

* * * * *